(12) United States Patent
Snoussl

(10) Patent No.: US 12,553,547 B2
(45) Date of Patent: Feb. 17, 2026

(54) DUAL SEALING FOR HIGH PRESSURE GASEOUS FUELS

(71) Applicant: PRATT & WHITNEY CANADA CORP., Longueuil (CA)

(72) Inventor: Oumayma Snoussl, Mississagua (CA)

(73) Assignee: Pratt & Whitney Canada Corp, Longueuil (CA)

( * ) Notice: Subject to any disclaimer, the term of this patent is extended or adjusted under 35 U.S.C. 154(b) by 0 days.

(21) Appl. No.: 18/732,220

(22) Filed: Jun. 3, 2024

(65) Prior Publication Data

US 2025/0369541 A1    Dec. 4, 2025

(51) Int. Cl.
*F16L 19/02* (2006.01)

(52) U.S. Cl.
CPC ....... *F16L 19/0218* (2013.01); *F16L 19/0206* (2013.01)

(58) Field of Classification Search
CPC .............. F16L 19/0212; F16L 19/0218; F16L 19/0206; F16L 19/02; F16L 19/043; F16L 19/046; F16L 19/04
See application file for complete search history.

(56) References Cited

U.S. PATENT DOCUMENTS

| | | | | |
|---|---|---|---|---|
| 1,912,299 A | * | 5/1933 | La | F16L 19/04 |
| 2,026,168 A | * | 12/1935 | Guarnaschelli | F16L 19/04 |
| 2,090,266 A | * | 8/1937 | La | F16L 19/046 |
| 2,466,317 A | * | 4/1949 | Kane, Jr. | F16L 19/04 |
| 2,775,471 A | * | 12/1956 | Douglass | F16L 19/046 |
| 3,258,279 A | * | 6/1966 | Johnsen | F16L 19/04 |
| 3,635,499 A | * | 1/1972 | Reddy | F16L 19/046 |
| 3,848,905 A | | 11/1974 | Hammer et al. | |
| 4,801,160 A | | 1/1989 | Barrington | |
| 5,176,409 A | | 1/1993 | Brooks | |
| 8,454,058 B2 | * | 6/2013 | Pechtold | F16L 19/0218 |
| 8,794,677 B2 | | 8/2014 | Halaczkiewicz et al. | |
| 10,316,998 B2 | | 6/2019 | Williams et al. | |

FOREIGN PATENT DOCUMENTS

| | | |
|---|---|---|
| CN | 204372396 U | 6/2015 |
| CN | 106247043 A | 12/2016 |
| CN | 106122621 B | 8/2018 |

(Continued)

OTHER PUBLICATIONS

Extended European Search Report for EP Application No. 25180591.7, dated Oct. 6, 2025, 8 pages.

*Primary Examiner* — Zachary T Dragicevich
(74) *Attorney, Agent, or Firm* — Kinney & Lange, P.A.

(57) ABSTRACT

A fitting assembly for a high-pressure gaseous fluid includes a female connector disposed about an axis and comprising a first frustoconical sealing surface, a male connector configured to be received in the female connector about the axis, the male connector comprising a second frustoconical sealing surface complementary with and configured to engage the first frustoconical sealing surface to form a first seal at a first location, an annular sealing element disposed between the female connector and the male connector to form a second seal at a second location, and a threaded coupling nut configured to engage the first and second frustoconical sealing surfaces and secure the female connector to the male connector.

18 Claims, 2 Drawing Sheets

(56) References Cited

FOREIGN PATENT DOCUMENTS

| CN | 111006085 | A | | 4/2020 | | |
|----|-----------|---|---|--------|---|---|
| EP | 0452357 | B1 | | 5/1995 | | |
| EP | 0781386 | B1 | | 11/1998 | | |
| EP | 4198365 | A1 | | 6/2023 | | |
| GB | 2416574 | A | * | 2/2006 | .......... | F16L 19/0212 |
| WO | WO-2010101617 | A1 | * | 9/2010 | .......... | F16L 19/0286 |

* cited by examiner

DUAL SEALING FOR HIGH PRESSURE GASEOUS FUELS

TECHNICAL FIELD

The present disclosure relates generally to fittings for fluid conduits and, more particularly, to fittings providing sealing for high pressure gaseous fluids.

BACKGROUND

Fitting assemblies developed for high pressure gaseous fluids and, particularly, high pressure hydrogen pose multiple challenges for aerospace applications. High pressure fluids require robust and often redundant sealing mechanisms. Multiple dual sealing fittings have been proposed for high pressure gaseous fluids, however, do not adequately address the challenges specific to transporting high pressure hydrogen. Hydrogen molecules are small and can easily escape through conventional rubber seals, such as O-rings, and many joints that adequately seal other gaseous fluids. Hydrogen gas is also incompatible with many materials used for sealing. Hydrogen gas can cause chemical degradation of polymer seals. While some polymer materials may resist chemical degradation, they can still experience degradation over time caused by swelling, embrittlement, and/or loss of elasticity. Current fitting assemblies require regular maintenance and replacement of seals.

SUMMARY

A fitting assembly for a high-pressure gaseous fluid includes a female connector disposed about an axis and comprising a first frustoconical sealing surface, a male connector configured to be received in the female connector about the axis, the male connector comprising a second frustoconical sealing surface complementary with and configured to engage the first frustoconical sealing surface to form a first seal at a first location, an annular sealing element disposed between the female connector and the male connector to form a second seal at a second location, and a threaded coupling nut configured to engage the first and second frustoconical sealing surfaces and secure the female connector to the male connector.

The present summary is provided only by way of example, and not limitation. Other aspects of the present disclosure will be appreciated in view of the entirety of the present disclosure, including the entire text, claims and accompanying figures.

Figure 1:
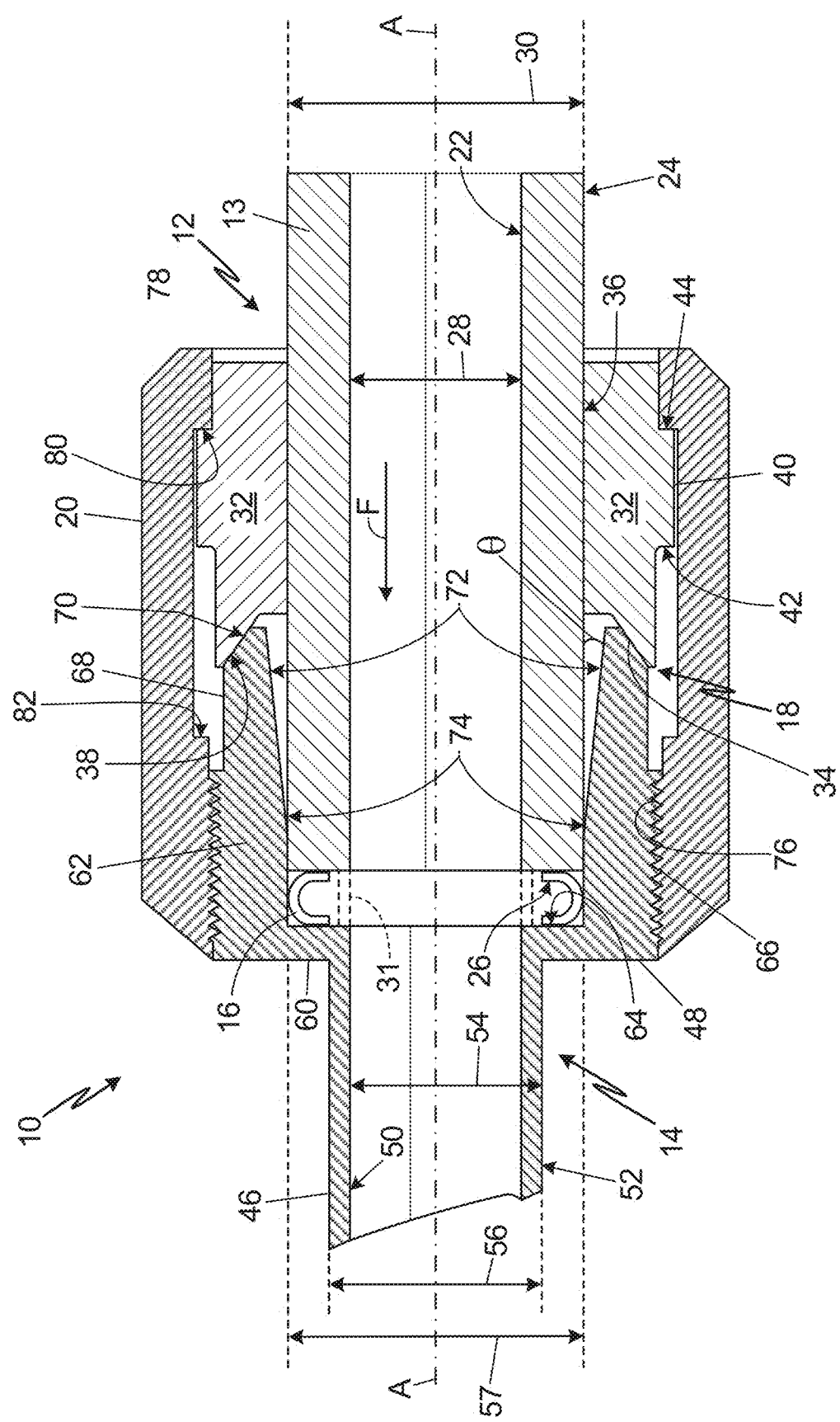
FIG. 1 is a cross-sectional view of a dual-sealing fitting assembly for high pressure gaseous fluids.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to dual-sealing fitting assemblies for high pressure gaseous fluids and, particularly, high pressure gaseous hydrogen fuel for aerospace applications. While the disclosed fitting assemblies are particularly designed for connecting a hydrogen fuel inlet of a fuel nozzle to a fuel manifold pipe, it will be understood by one of ordinary skill in the art that the disclosed fitting assemblies can be used or adapted for use in a wide variety of high-pressure fluid systems and are not limited to the applications disclosed herein. Furthermore, while components of the disclosed fitting assemblies are designed to address the unique challenges posed by high pressure gaseous hydrogen, the disclosed fitting assemblies are suitable for use with other high pressure gaseous fluids.

FIG. 1 is a cross-sectional view of interchangeable fitting assembly 10 configured for connecting pipes for transport of a high-pressure gaseous fluid. Fitting assembly 10 includes male connector 12, female connector 14, sealing element 16, frustoconical seal 18, and coupling nut 20. Fitting assembly 10 is configured to provide dual sealing between male connector 12 and female connector 14, utilizing sealing element 16 and frustoconical seal 18. Coupling nut 20 is configured to provide pressure needed to ensure sealing by each of sealing element 16 and frustoconical seal 18. Male connector 12 and female connector 14 have coaxial bores provided therethrough upon assembly. Male connector 12 is configured to be engageable with any of several female connectors 14, and female connector 14 is similarly configured to be engageable with any of several male connectors 12.

Male connector 12 includes pipe 13 having axis A, radially inner surface 22, radially outer surface 24, first sealing surface 26, inner diameter 28, and outer diameter 30. First sealing surface 26 defines a first end of pipe 13, extending radially between radially inner surface 22 and radially outer surface 24. A pipe wall defined between radially inner surface 22 and radially outer surface 24, can have a uniform thickness. Male connector 12 can optionally include annular flange 31 extending axially from first sealing surface 26 of pipe 13 and radially aligned with radially inner surface 22. Optional annular flange 31 has a thickness less than the wall thickness defined between radially inner surface 22 and radially outer surface 24 of pipe 13.

Male connecter 12 can include sleeve 32 disposed on radially outer surface 24 of pipe 13. Sleeve 32 extends axially from first end 34 to second end 36. First end 34 includes first frustoconical sealing surface 38. Sleeve 32 can include annular flange 40 extending radially outward from sleeve 32 between first end 34 and second end 36. Annular flange 40 extends axially from first retention surface 42 to second retention surface 44. Second retention surface 44 is disposed adjacent to but axially separated from second end 36. Sleeve 32 can be attached to radially outer surface 24 of pipe 13 by brazing or can be integrally formed with pipe 13.

Female connector 14 includes pipe 46 and fitting 48 having axis A. Female connector is coaxial with male connector 12 upon assembly. Pipe 46 has radially inner surface 50, radially outer surface 52, inner diameter 54, and outer diameter 56. A wall thickness of pipe 46, defined between radially inner surface 50 and radially outer surface 52, can be uniform. Fitting 48 extends radially outward and axially outward from pipe 46. Fitting 48 has inner diameter 57 at a first end adjacent to pipe 46. Inner diameter 57 is greater than inner diameter 54 of pipe 46. Inner diameter 57 can be slightly greater than outer diameter 30 of pipe 13 to allow male connector 12 to be slidingly received in fitting 48.

Fitting 48 includes radially extending portion 60 and axially extending portion 62. Radially extending portion 60 can extend from pipe 46 to a radial location substantially aligned with radially outer surface 24 of pipe 13 upon assembly (and defining inner diameter 57). Radially extending portion 60 defines second sealing surface 64. Second sealing surface extends radially and faces first sealing surface 26 upon assembly with male connector 12. Axially extending portion 62 includes threaded portion 66 and flexible portion 68. Threaded portion 66 is disposed on a radially outer surface of axially extending portion 62. Flexible portion 68 includes second frustoconical sealing surface 70 disposed at an axial outermost end and flared radially inner surface 72. Second frustoconical sealing surface 70 is configured to engage first frustoconical sealing surface 38 upon assembly with male connector 12. Flared radially inner surface 72 defines a frustoconical shape. Flared radially inner surface 72 extends radially outward from a cylindrical radially inner surface 74, which is disposed opposite threaded portion 66. Cylindrical radially inner surface 74 extends parallel to pipe 46 and radially outer surface 24 of male connector 12 upon assembly. Flared radially inner surface 72 extends at angle θ relative to axis A, cylindrical radially inner surface 74, and radially outer surface 24 of male connector 12 upon assembly. Flexible portion 68 can have a wall thickness that tapers inward from threaded portion 66 to second frustoconical sealing surface 70. The wall thickness and angle θ of flared radially inner surface 72 can be selected to provide a desired flexibility of flexible portion 68 during assembly with male connector 12.

Sealing element 16 is an annular body configured to be disposed between first sealing surface 26 of male connector 12 and second sealing surface 64 of female connector 14 upon assembly. Sealing element 16 is disposed radially inward of cylindrical radially inner surface 74 and radially outward of radially inner surfaces 22 and 50 and annular flange 31 when annular flange 31 is provided. Sealing element 16 is an annular member configured to engage first sealing surface 26 of male connector 14 and second sealing surface 64 of female connector 14 to provide sealing of an axial gap formed therebetween. Sealing element 16 can be a compressible C-seal, V-seal, W-seal, or seal of customized shape. Sealing element 16 can have oppositely disposed legs configured to abut first and second sealing surfaces 26 and 64. Sealing element 16 can be disposed to have an opening (i.e., between legs) facing fluid flow F through fitting assembly 10.

Coupling nut 20 is disposed radially outward of male connector 12 and female connector 14 upon assembly. Coupling nut 20 includes threaded portion 76 disposed at a radially inner surface adjacent to a first axial end. Coupling nut 20 includes annular flange 78 adjacent to an opposite second axial end. Annular flange 78 extends radially inward and includes radially extending surface 80 configured to engage second retention surface 44 upon assembly. Threaded portion 76 can be disposed on an annular flange that extends radially inward and defines radially extending surface 82. Radially extending surface 82 can catch on first retention surface 42 during disassembly.

Components of fitting assembly 10, including male connector 12, female connector 14, sealing element 16, and coupling nut 20 can be formed of one or more materials suitable for containing high pressure gaseous fluid and, particularly hydrogen. Suitable materials can include, for example, stainless steel or nickel-based alloys (e.g., Inconel®). Surface treatments to reduce roughness can be provided to contact areas between interfacing components in a gaseous fluid leakage flow path to reduce leakage.

In assembly, sealing element 16 is disposed in fitting 48 of female connector 14. Sealing element 16 abuts second sealing surface 64. Sealing element 16 can abut cylindrical radially inner surface 74. In some embodiments, sealing element 16 can be retained in fitting 48 by a friction fit. In alternative embodiments, sealing element 16 can be spaced from cylindrical radially inner surface 74 and loosely retained in fitting 48.

Sealing element 16 is formed of a compressible metal that is impermeable to and chemically compatible with gaseous fluids (e.g., hydrogen fuel) provided through fitting assembly 10. First sealing surface 26, second sealing surface 64, and an outer surface of sealing element 16 configured to contact first sealing surface 26 and second sealing surface 64, can be treated to provide smooth surfaces. Removing surface roughness reduces leakage pathways between the sealing surfaces.

As illustrated in FIG. 1, sealing element 16 can be a C-seal, defined by a C-shape opening to fluid flow F in fitting assembly 10. Sealing element 16 can have any shape suitable for sealing the axial gap between male connector 12 and female connecter 14 (i.e., between first sealing surface 26 and second sealing surface 64). Sealing element 16 is open to fluid flow F (e.g., a void between oppositely disposed legs of sealing element 16 opens to the pathway of fluid flow F) such that the force exerted by fluid flow F against sealing element 16 tends to press sealing element 16 against first and second sealing surfaces 26 and 64 and cylindrical radially inner surface 74. The pressure of fluid flow F on an oppositely disposed sealing element 16 (i.e., opening to cylindrical radially inner surface 74) may cause sealing element 16 to collapse or separate from first and second sealing surfaces 26 and 64 as the high pressure gaseous fluid is forced around legs of the oppositely oriented sealing element 16.

Pipe 13 of male connector 12 is slidingly received in axially extending portion 62 of female connector 14. Pipe 13 can be inserted into fitting 48 until first sealing surface 26 abuts sealing element 16 and/or first frustoconical sealing surface 38 abuts second frustoconical sealing surface 70. Cylindrical radially inner surface 74 of female connector 14 can engage radially outer surface 24 of pipe 13. Flared radially inner surface 72 is spaced from radially outer surface 24 of pipe 13. Inner diameter 28 of pipe 13 can match inner diameter 54 of pipe 46 such that radially inner surface 22 of pipe 13 is aligned with radially inner surface 50 of pipe 46. Outer diameter 30 of pipe 13 can be equal to, less than, or greater than outer diameter 56. A wall thickness defined between inner diameter 28 and outer diameter 30 can be greater than a radial thickness of sealing element 16 to ensure sealing element 16 does not extend radially inward of radially inner surfaces 22 and 50 of pipe 13 and pipe 46, respectively.

Once male connector 12 is received in female connector 14, coupling nut 20 can be secured to female connector 14 via threaded portions 76 and 66. Coupling nut 20 can be hand-tightened to provide pressure needed to ensure double sealing by each of sealing element 16 and frustoconical seal 18. Annular flange 78 of coupling nut 20 can engage sleeve 32 to advance male connector 12 further into female connector 14. Specifically, radially extending surface 80 of coupling nut can apply an axial force to second retention surface 44 of male connector 12 to axially advance first sealing surface 26 of pipe 13 toward second sealing surface 64 of female connector 14. Sealing element 16 is compressed between first sealing surface 26 and second sealing surface 64 with axial advancement of pipe 13. Sealing element 16 is configured to restrain compression such that sealing element 16 does not collapse with advancement of pipe 13. An axial force exerted by sealing element 16 against each of first and second sealing surfaces 26 and 64 effectively seals the axial gap between first sealing surface 26 and second sealing surface 64.

Advancement of sleeve 32 further causes first frustoconical sealing surface 38 to overlap and apply radially inward pressure to second frustoconical sealing surface 70. First frustoconical sealing surface 38 and second frustoconical sealing surface 70 are disposed at complementary angles. First frustoconical sealing surface 38 faces radially inward toward pipe 13. Second frustoconical sealing surface 70 faces radially outward toward coupling nut 20. As pressure is applied against second frustoconical sealing surface 70, flexible portion 68 of female connector 14 can deflect radially inward, reducing angle θ and the gap formed between flexible portion 68 and pipe 13. A contact surface area between first and second frustoconical sealing surfaces 38 and 70 can increase as pressure is applied against flexible portion 68 and second frustoconical surface 70. First and second frustoconical sealing surfaces 38 and 70 can be treated to provide smooth surfaces. Removing surface roughness reduces leakage pathways between first and second frustoconical sealing surfaces 38 and 70.

Optional annular flange 31 can be provided to prevent over tightening of coupling nut 20. Optional annular flange 31 can be provided as a safety element to prevent axial advancement of male connector 12 into fitting 48 of female connector 14 beyond a point at which sealing element 16 can be damaged or sealing surfaces can be compromised due to excessive deformation.

Inner diameter 28 of pipe 13 can match inner diameter 54 of pipe 46. Pressurized fluid can be provided through fitting assembly 10 in a direction illustrated by fluid flow F or in an opposite direction. Sealing element 16 seals an axial gap between male connector 12 and female connector 14. Frustoconical seal 18 is located downstream of sealing element 16 along a pathway of potential leakage and provides a redundant seal between male connector 12 and female connector 14 for any fluid that leaks around sealing element 16 and along radially outer surface 24 of pipe 13. Sealing element 16 can have any shape suitable for sealing the axially extending gap between male connector 12 and female connector 14. Generally, sealing element 16 can include a pair of oppositely disposed legs configured to engage oppositely disposed first and second sealing surfaces 26 and 64. In some embodiments, a sealing surface area of sealing element 16 can be localized to ends or discrete locations along sides of legs of the C-seal (or otherwise shaped seal) to closely control sealing infaces. Frustoconical seal 18 has first and second frustoconical sealing surfaces disposed at an angle relative to axis A. Frustoconical seals are typically oriented at 37° or 45° but the orientation can be any angle suitable for providing a desired sealing interface.

In a non-limiting example, male connector 112 can be connected to a fluid vessel, such as a fuel manifold at a second end (not shown) opposite end 113. Female connector 114 can be connected to a fuel nozzle.

In an alternative embodiment, fitting assembly 10 can be configured with threaded connections provided between male connector 16 and coupling nut 20 as opposed to female connector 14 and coupling nut 20 as shown in FIG. 1. For example, in an alternative embodiment, fitting assembly 10 can be modified to provide threaded portion 66 on sleeve 32 of male connector 16 and threaded portion 78 on an opposite end of coupling nut 20. An annular retention flange (e.g., 40) can be provided on female connector 14 to enable coupling nut 20 to move female connector 14 axially toward frustoconical sealing surface 38.

Figure 2:
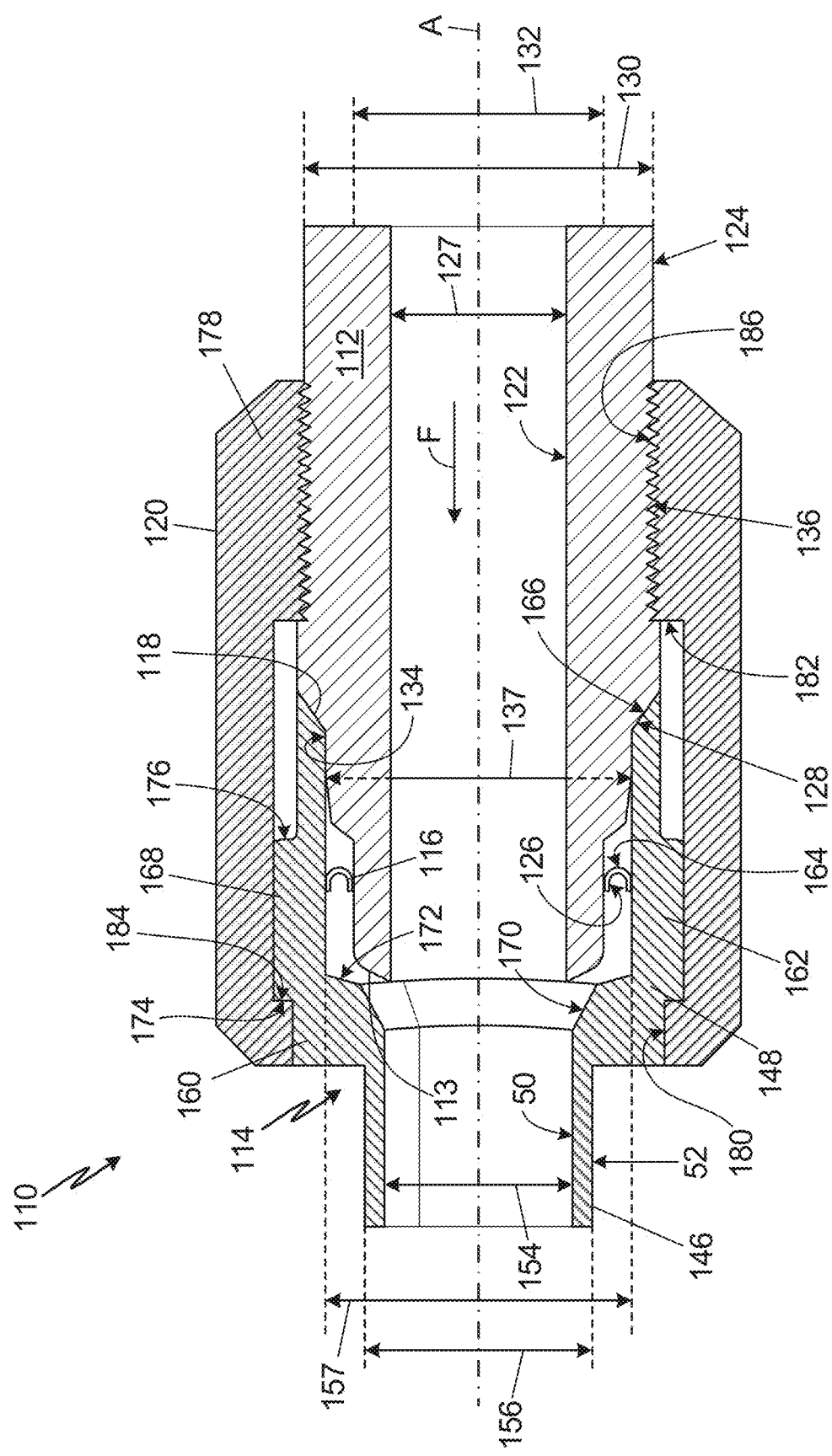
FIG. 2 is a cross-sectional view of an alternative dual-sealing fitting assembly for high pressure gaseous fluids.

FIG. 2 is a cross-sectional view of interchangeable fitting assembly 110 configured for connecting pipes for transport of a high-pressure gaseous fluid. Fitting assembly 110 includes male connector 112, female connector 114, sealing element 116, frustoconical seal 118, and coupling nut 120. Fitting assembly 110 is configured to provide dual sealing between male connector 112 and female connector 114, utilizing sealing element 116 and frustoconical seal 118. Coupling nut 120 is configured to provide pressure needed to ensure sealing at frustoconical seal 118. Male connector 112 and female connector 114 have coaxial bores provided therethrough upon assembly. Male connector 112 is configured to be engageable with any of several female connectors 114, and female connector 114 is similarly configured to be engageable with any of several male connectors 112.

Male connector 112 is a pipe having axis A, end 113, radially inner surface 122, radially outer surface 124, first radial sealing surface 126, first frustoconical sealing surface 128, and inner diameter 127. Radially outer surface 124 can be stepped radially inward toward end 113 such that an outer diameter of male connector 112 is reduced from first outer diameter 130 to second outer diameter 132. A pipe wall defined between radially inner surface 122 and radially outer surface 124 is likewise reduced toward end 113. First radial sealing surface 126 and first frustoconical sealing surface 128 define portions of radially outer surface 124. Radially outer surface 124 can additionally include axially extending surface 134 and threaded surface 136. Axially extending surface 134 can be disposed between first radial sealing surface 126 and first frustoconical sealing surface 128. Radially outer surface 124 can have outer diameter 137 defined by axially extending surface 128, which is greater than second outer diameter 132 and less than outer diameter 130. First radial sealing surface 126 is disposed adjacent to end 113 on a portion of radially outer surface 124 defined by second outer diameter 132. First frustoconical sealing surface 128 is disposed aft of first radial sealing surface 126 relative to end 113. Threaded surface 136 can be disposed aft of first frustoconical sealing surface on a portion of radially outer surface 124 defined by first outer diameter 130.

Female connector 114 includes pipe 146 and coaxial fitting 148. Female connector is disposed on axis A, coaxial with male connector 112, upon assembly. Pipe 146 has radially inner surface 150, radially outer surface 152, inner diameter 154, and outer diameter 156. A wall thickness of pipe 146, defined between radially inner surface 150 and radially outer surface 152, can be uniform. Fitting 148 extends radially outward and axially outward from pipe 146. Fitting 148 has inner diameter 157 at a first end adjacent to pipe 146. Inner diameter 157 is greater than inner diameter 154 of pipe 146. Inner diameter 157 can be slightly greater than outer diameter 130 of male connector 112 to allow male connector 112 to be slidingly received in fitting 148.

Fitting 148 includes radially extending portion 160 and axially extending portion 162. Radially extending portion 160 can extend from pipe 146 to a radial location aligned with axially extending surface 134 of male connector 112 upon assembly (and defining inner diameter 157). Axially extending portion 162 includes second radial sealing surface 164, second frustoconical surface 166, and annular flange 168. Second radial sealing surface 164 defines a radially inner surface and is configured to engage sealing element 116 upon assembly with male connector 112. Second frustoconical sealing surface 166 is configured to engage first frustoconical sealing surface 128 upon assembly with male connector 112. Fitting 148 can additionally include frustoconical sealing surface 170 defining a radially inner surface extending from radially inner surface 50 of pipe 146. Radially extending portion 160 can include radially extending surface 172 disposed between and connecting frustoconical sealing surface 170 and second radial sealing surface 164. Radially extending surface 172 is disposed adjacent to end 113 of male connector 112 upon assembly. Annular flange 168 extends radially outward. Annular flange 168 extends axially from first retention surface 174 to second retention surface 176.

Sealing element 116 is an annular body configured to be disposed between first radial sealing surface 126 of male connector 112 and second radial sealing surface 164 of female connector 114 upon assembly. Sealing element 116 is an annular member configured to engage first radial sealing surface 126 of male connector 114 and second radial sealing surface 164 of female connector 114 to provide sealing of a radial gap formed therebetween. Sealing element 116 can be a compressible C-seal, V-seal, W-seal, or seal of customized shape. Sealing element 116 can have oppositely disposed legs configured to abut first and second sealing surfaces 126 and 164. Sealing element 116 can be disposed to have an opening (i.e., between legs) facing radially extending surface 172 and a fluid flow into the radial gap sealed by sealing element 116.

Coupling nut 120 is disposed radially outward of male connector 112 and female connector 114 upon assembly. Coupling nut 120 can include first annular flange 178 disposed at a first axial end and second annular flange 180 disposed at an opposite axial end. First and second annular flanges 178 and 180 extend radially inward. First annular flange 178 can include radially extending surface 182 configured to catch on second retention surface 176 of female connector 114 during disassembly. Second annular flange 180 can include radially extending surface 184 configured to engage first retention surface 174 of female connecter 114 upon assembly. Coupling nut 120 includes threaded portion 186. Threaded portion 186 can define a radially inner surface of first annular flange 178. Threaded portion 186 is configured to engage threaded portion 136 of male connector 112 upon assembly.

Components of fitting assembly 110, including male connector 112, female connector 114, sealing element 116, and coupling nut 120, can be formed of one or more materials suitable for containing high pressure gaseous fluid, including, for example, stainless steel or nickel-based alloys (e.g., Inconel®). Surface treatments to reduce roughness can be provided to contact areas between interfacing components in a gaseous fluid leakage flow path to reduce leakage.

In assembly, sealing element 116 can be disposed on radially outer surface 124 of male connector 112 adjacent to end 113. Specifically, sealing element 116 can be disposed on first radial sealing surface 126 aft of end 113. Sealing element 116 can be press-fit onto first radial sealing surface 126. Sealing element 116 can be oriented such sealing element 116 opens to fluid flow F (e.g., oppositely disposed legs of the seal extend toward radially extending surface 172 and a void between oppositely disposed legs opens to the pathway of fluid flow F).

Sealing element 116 is formed of a compressible metal that is impermeable to and chemically compatible with gaseous fluids (e.g., hydrogen fuel) provided through fitting assembly 110. First radial sealing surface 126, second radial sealing surface 164, and an outer surface of sealing element 116, configured to contact first sealing surface 126 and second sealing surface 164, can be treated to provide smooth surfaces. Removing surface roughness reduces leakage pathways between the sealing surfaces.

As illustrated in FIG. 2, sealing element 116 can be a C-seal, defined by a C-shape opening to fluid flow F in fitting assembly 110 via a gap between end 113 of male connector 112 and fitting 148 of female connector 114. Sealing element 116 can have any shape suitable for sealing the radial gap between male connector 112 and female connecter 114 (i.e., between first radial sealing surface 126 and second radial sealing surface 164). Sealing element 116 is open to fluid flow F such the force exerted by fluid flow F against sealing element 116 tends to press sealing element 116 against first and second radial sealing surfaces 126 and 164. The pressure of fluid flow F on an oppositely disposed sealing element 116 (i.e., closed to fluid flow F) may cause sealing element 116 to collapse or separate from first and second radial sealing surfaces 126 and 164 as the fluid flow is forced around opposing legs of the oppositely disposed sealing element 116.

Male connector 112, including sealing element 116, is slidingly received in fitting 148 of female connector 114. Male connector 112 can be inserted into fitting 148 until first frustoconical sealing surface 128 abuts second frustoconical sealing surface 166. A tool (not shown) can be used to compress an outer diameter of sealing element 116 to allow sealing element 116 to be received in fitting 148 along second radial sealing surface 164. Sealing element 116 is configured to seal the radial gap between first radial sealing surface 126 and second radial sealing surface 164 upon being received in fitting 148. A portion of second radial sealing surface 164 can axially overlap and contact axially extending surface 134 of male connector 112.

Once male connector 112 is received in female connector 114, coupling nut 120 can be secured to male connector 112 via threaded portions 136 and 186. Coupling nut 120 can be hand-tightened to provide pressure needed to ensure sealing by frustoconical seal 118. Second annular flange 180 of coupling nut 120 can engage annular flange 168 of female connector. Radially extending surface 184 can apply axial force to first retention surface 174, causing axial advancement of second frustoconical surface 166 toward first frustoconical surface 128. Annular flange 168 can axially overlap first radial sealing surface 126 upon assembly.

First frustoconical surface 128 and second frustoconical surface 166 are disposed at complementary angles. First frustoconical surface 128 faces radially outward toward coupling nut 120. Second frustoconical surface 166 faces radially inward toward male connector 112. A contact surface area between first and second frustoconical sealing surfaces 128 and 166 can increase as pressure is applied against first retention surface 174 with tightening of coupling nut 120. First and second frustoconical sealing surfaces 128 and 166 can be treated to provide smooth sealing surfaces. Removing surface roughness reduces leakage pathways between first and second frustoconical sealing surfaces 128 and 166.

Inner diameter 127 of male connector 112 can match inner diameter 154 of pipe 146 of female connector 114. Pressurized fluid can be provided through fitting assembly 110 in a direction illustrated by fluid flow F or in an opposite direction. Sealing element 116 seals a radial gap between male connector 112 and female connector 114. Frustoconical seal 118 is located downstream of sealing element 116 along a pathway of potential leakage and provides a redundant seal between male connector 112 and female connector 114 for any fluid that leaks around sealing element 116 and along radially outer surface 124 of male connector 112. Sealing element 116 can have any shape suitable for sealing the radial extending gap between male connector 112 and female connector 114. Generally, sealing element 116 can include a pair of oppositely disposed legs configured to engage oppositely disposed first and second radial sealing surfaces 126 and 164. In some embodiments, a sealing surface area of sealing element 116 can be localized to ends or discrete locations along sides of legs of the C-seal (or otherwise shaped seal) to closely control sealing infaces. Frustoconical seal 118 has complementary first and second frustoconical sealing surfaces disposed at an angle relative to axis A. Frustoconical seals are typically oriented at 37° or 45° but the orientation can be any angle suitable for providing a desired sealing interface.

In a non-limiting example, male connector 112 can be connected to a fluid vessel, such as a fuel manifold at a second end (not shown) opposite end 113. Female connector 114 can be connected to a fuel nozzle.

In an alternative embodiment, fitting assembly 110 can be configured with threaded connections provided between female connector 114 and coupling nut 120 as opposed to male connector 116 and coupling nut 120 as shown in FIG. 2. For example, in an alternative embodiment, fitting assembly 110 can be modified to provide threaded portion 136 on an axially extending portion (i.e., 162) of female connector 114 and threaded portion 186 on an opposite end of coupling nut 120. An annular retention flange (e.g., 168) can be provided on male connector 116 to enable coupling nut 120 to move male connector 116 axially toward frustoconical sealing surface 128.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A fitting assembly for a high-pressure gaseous fluid includes a female connector disposed about an axis and comprising a first frustoconical sealing surface, a male connector configured to be received in the female connector about the axis, the male connector comprising a second frustoconical sealing surface complementary with and configured to engage the first frustoconical sealing surface to form a first seal at a first location, an annular sealing element disposed between the female connector and the male connector to form a second seal at a second location, and a threaded coupling nut configured to engage the first and second frustoconical sealing surfaces and secure the female connector to the male connector.

The fitting assembly of the preceding paragraph can optionally include, additionally and/or alternatively, any one or more of the following features, configurations and/or additional components:

In an embodiment of the fitting assembly of the preceding paragraphs, the first location can be downstream of the second location on a pathway of potential leakage of the high-pressure gaseous fluid from the second location.

In an embodiment of the fitting assembly of any of the preceding paragraphs, the annular sealing element can include oppositely disposed legs configured to engage oppositely disposed sealing surfaces of the male connector and the female connector.

In an embodiment of the fitting assembly of any of the preceding paragraphs, the annular sealing element can be disposed in an axial gap defined between radially extending sealing surfaces of the male connector and the female connector.

In an embodiment of the fitting assembly of any of the preceding paragraphs, the male connector can include an annular flange configured to extend into the axial gap radially inward of the sealing element.

In an embodiment of the fitting assembly of any of the preceding paragraphs, the female connector can include a threaded portion configured to engage the threaded coupling nut.

In an embodiment of the fitting assembly of any of the preceding paragraphs, the female connector can include a pipe having a first inner diameter and an axially extending fitting having a second diameter greater than the first diameter, wherein the axially extending fitting is configured to receive the male connector.

In an embodiment of the fitting assembly of any of the preceding paragraphs, the first inner diameter can be equal to an inner diameter of the male connector.

In an embodiment of the fitting assembly of any of the preceding paragraphs, the axially extending fitting can include a first end comprising the threaded portion, a second end comprising the first frustoconical surface, and a flexible portion extending between the threaded portion and the second end, wherein the flexible portion can have a radially inner surface that flares radially outward from the axis.

In an embodiment of the fitting assembly of any of the preceding paragraphs, the sealing element can be disposed radially inward of and axially aligned with the threaded portion.

In an embodiment of the fitting assembly of any of the preceding paragraphs, the male connector can include a sleeve extending radially outward from the radially outer surface, wherein the sleeve comprises the second frustoconical surface.

In an embodiment of the fitting assembly of any of the preceding paragraphs, the second frustoconical surface can face radially inward.

In an embodiment of the fitting assembly of any of the preceding paragraphs, the sleeve can include an annular flange configured to engage the threaded coupling nut.

In an embodiment of the fitting assembly of any of the preceding paragraphs, the annular sealing element can be disposed in a radial gap defined between a first axially extending sealing surface of the male connector and a second axially extending sealing surface of the female connector.

In an embodiment of the fitting assembly of any of the preceding paragraphs, the male connector can include a threaded portion configured to engage the threaded coupling nut.

In an embodiment of the fitting assembly of any of the preceding paragraphs, the female connector can include an annular flange disposed on a radially outer surface of the female connector, the annular flange configured to engage the threaded coupling nut.

In an embodiment of the fitting assembly of any of the preceding paragraphs, the second axially extending sealing surface can be disposed on a radially inner surface of the female connector opposite the annular flange.

In an embodiment of the fitting assembly of any of the preceding paragraphs, the male connector can include a third axially extending surface disposed between the first axially extending sealing surface and the second frustoconical sealing surface, the third axial extending surface configured to contact a portion of the second axially extending sealing surface.

In an embodiment of the fitting assembly of any of the preceding paragraphs, the second frustoconical sealing surface can face radially outward.

In an embodiment of the fitting assembly of any of the preceding paragraphs, annular sealing element can be metal.

In an embodiment of the fitting assembly of any of the preceding paragraphs, the annular sealing element can be selected from a group of seal shapes consisting of a C-seal, W-seal, and V-seal.

The invention claimed is:

1. A fitting assembly for a high-pressure gaseous fluid, the fitting assembly comprising:
   a female connector disposed about an axis and comprising a first sealing surface facing radially outward;
   a male connector configured to be received in the female connector about the axis, the male connector comprising a second sealing surface facing radially inward, the second sealing surface configured to engage the first sealing surface to form a first seal at a first location, wherein at least one of the first sealing surface and the second sealing surface is frustoconical;
   an annular sealing element disposed between the female connector and the male connector to form a second seal at a second location, wherein the annular sealing element comprises oppositely disposed legs configured to engage oppositely disposed third and fourth sealing surfaces of the male connector and the female connector, respectively, and wherein the first location is downstream of the second location on a pathway of potential leakage of the high-pressure gaseous fluid from the second location; and
   a threaded coupling nut configured to engage the first and second sealing surfaces and secure the female connector to the male connector.

2. The fitting assembly of claim 1, wherein the annular sealing element is disposed in an axial gap defined between the third and fourth sealing surfaces of the male connector and the female connector, wherein the third and fourth sealing surfaces extend radially.

3. The fitting assembly of claim 2, wherein the male connector comprises an annular flange configured to extend into the axial gap radially inward of the sealing element.

4. The fitting assembly of claim 2, wherein the female connector comprises a threaded portion configured to engage the threaded coupling nut.

5. The fitting assembly of claim 1, wherein the female connector comprises:
   a pipe having a first inner diameter; and
   an axially extending fitting having a second diameter greater than the first diameter, wherein the axially extending fitting is configured to receive the male connector.

6. The fitting assembly of claim 5, wherein the first inner diameter is equal to an inner diameter of the male connector.

7. The fitting assembly of claim 5, wherein the axially extending fitting comprises:
   a first end comprising the threaded portion;
   a second end comprising the first sealing surface; and
   a flexible portion extending between the threaded portion and the second end, wherein the flexible portion has a radially inner surface that flares radially outward from the axis.

8. The fitting assembly of claim 7, wherein the sealing element is disposed radially inward of and axially aligned with the threaded portion.

9. The fitting assembly of claim 7, wherein the male connector comprises a sleeve extending radially outward from the radially outer surface, wherein the sleeve comprises the second sealing surface.

10. The fitting assembly of claim 9, wherein the second sealing surface faces radially inward.

11. The fitting assembly of claim 10, wherein the sleeve comprises an annular flange configured to engage the threaded coupling nut.

12. The fitting assembly of claim 1, wherein the annular sealing element is disposed in a radial gap defined between the third and fourth sealing surfaces, wherein the third and fourth sealing surfaces extend axially.

13. The fitting assembly of claim 12, wherein the male connector comprises a threaded portion configured to engage the threaded coupling nut and wherein the female connector comprises an annular flange disposed on a radially outer surface of the female connector, the annular flange configured to engage the threaded coupling nut.

14. The fitting assembly of claim 4, wherein the fourth sealing surface is disposed on a radially inner surface of the female connector opposite the annular flange.

15. The fitting assembly of claim 14, wherein the male connector comprises an axially extending surface disposed between the third sealing surface and the second sealing surface, the axially extending surface configured to contact a portion of the fourth sealing surface.

16. The fitting assembly of claim 15, wherein the second sealing surface faces radially outward.

17. The fitting assembly of claim 1, wherein annular sealing element is metal.

18. The fitting assembly of claim 1, wherein the first and second sealing surfaces are frustoconical.

* * * * *